Figure 1:
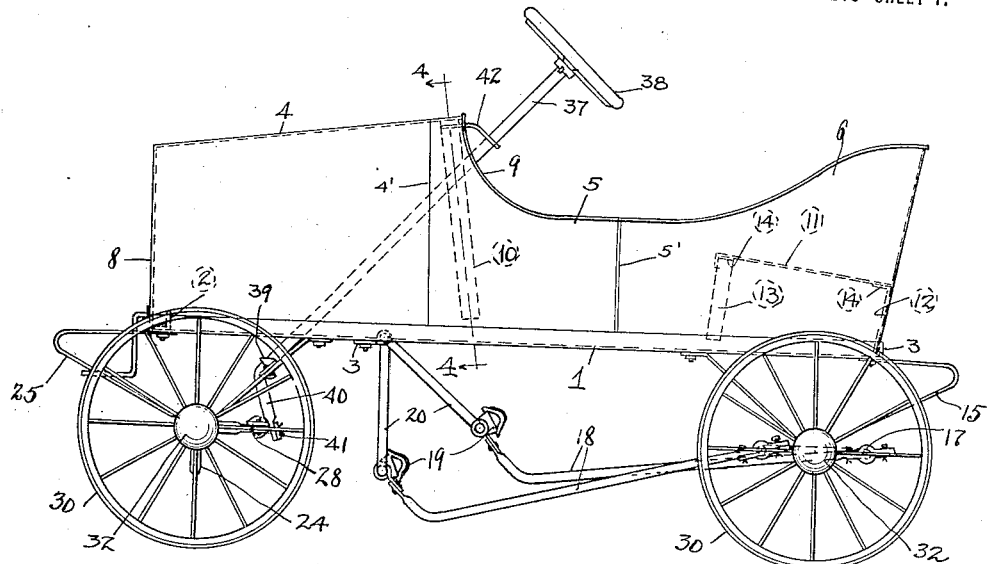

W. J. SLEFFEL.
CHILD'S VEHICLE CONSTRUCTION.
APPLICATION FILED FEB. 17, 1919.

1,354,141.

Patented Sept. 28, 1920.
2 SHEETS—SHEET 1.

INVENTOR
William J. Sleffel
By Day, Oberlin & Day
ATTORNEYS.

W. J. SLEFFEL.
CHILD'S VEHICLE CONSTRUCTION.
APPLICATION FILED FEB. 17, 1919.
1,354,141.
Patented Sept. 28, 1920.
2 SHEETS—SHEET 2.
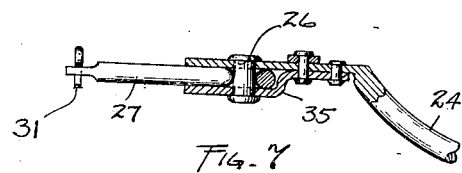
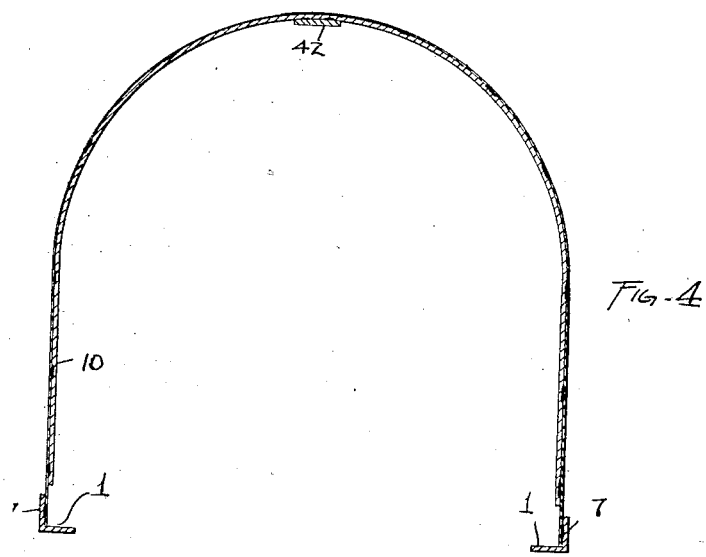
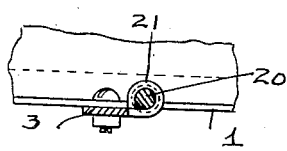
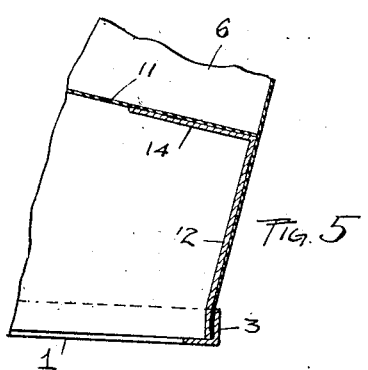
INVENTOR
William J. Sleffel
BY Day, Oberlin & Day
ATTORNEYS

UNITED STATES PATENT OFFICE.

WILLIAM J. SLEFFEL, OF LAKEWOOD, OHIO, ASSIGNOR TO THE KIRK LATTY MANUFACTURING COMPANY, OF CLEVELAND, OHIO, A CORPORATION OF OHIO.

CHILD'S-VEHICLE CONSTRUCTION.

1,354,141.  Specification of Letters Patent.  Patented Sept. 28, 1920.

Application filed February 17, 1919. Serial No. 277,484.

*To all whom it may concern:*

Be it known that I, WILLIAM J. SLEFFEL, a citizen of the United States, and a resident of Lakewood, county of Cuyahoga, and State of Ohio, have invented a new and useful Improvement in Children's-Vehicle Construction, of which the following is a specification, the principle of the invention being herein explained and the best mode in which I have contemplated applying that principle, so as to distinguish it from other inventions.

The present improvements, relating, as indicated, to children's vehicles, are directed to the use of children's toy automobiles, which is the type of child's vehicle that is at present of very considerable use. In such vehicles the operation is by means of pedals connected to eccentrics on a rear axle, and a steering wheel is provided for operating the front wheels, while it is usual to provide a metal or wood body of roughly the general lines of an automobile body. All of these parts are so assembled in order to give an approximate resemblance to a small automobile.

It is extremely difficult to construct a vehicle of this sort which will be satisfactory. The frame and body have to be of light wood and of relatively thin and flimsy materials, while the over-all length of the vehicle is considerable, and it is almost impossible to provide sufficient strength in the various parts to hold them rigidly together. Furthermore, they are subjected to very rough usage and are given almost no care so that the parts quickly become loosened from each other, and the many bolts and nuts, which necessarily have to be used, come out, with the result that in a very short time the vehicle falls to pieces.

It is the primary object of the present invention to provide a vehicle of this type which will be more simple to construct and more rigid when assembled than any heretofore made, and one in which the parts are so jointed together that there will be little liability of their coming apart. Other objects of the invention are the provision of improved means for steering the vehicle and improved features of construction at various points. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 2:
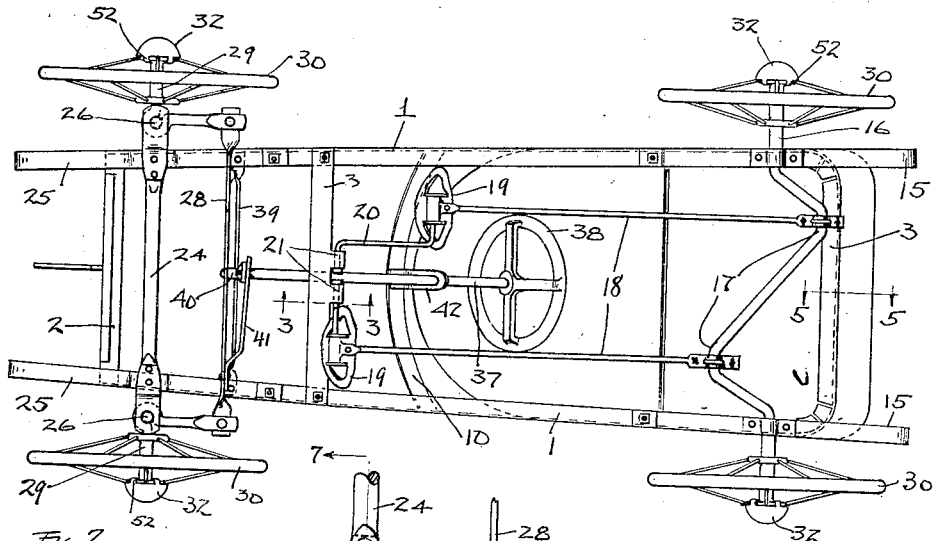
Figure 6:
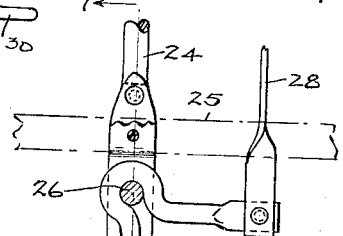

Figure 1 is a side elevation of my invention; Fig. 2 is a bottom plan view of the same; Fig. 3 is a section on the line 3—3, Fig. 2; Fig. 4 is a section on the line 4—4, Fig. 1; Fig. 5 is a section on the line 5—5, Fig. 2; Fig. 6 is a plan view partially in horizontal section of my improved wheel spindle and steering mechanism; and Fig. 7 is a section on the line 7—7, Fig. 6.

Referring now to Figs. 1 and 2, the vehicle comprises a substantially rectangular open frame having slightly converging side members 1 connected together by means of transverse members 2 and 3. The side members 1 are made to converge slightly in order to narrow the frame down sufficiently at the forward end to permit of the mounting of the steering mechanism, which will presently be described, between the frame and the wheels.

Mounted upon the frame, consisting of the members 1, 2 and 3, is an open metal body formed of pressed metal sheets, which are integrally jointed together. These sections, in which the body is made, are indicated at 4, 5 and 6. These sections, when formed into the desired shape, are integrally joined at the seams 4' and 5', so that the body when assembled is an integral solid pressed metal sheet without any securing bolts, screws, rivets or the like, which are liable to become loose and to cause the parts of the body to fall apart. This body is then set onto the frame with the lower edges of the body within, and in contact with, the upwardly extending flanges 7 of the side frame members 1, in the manner shown in Fig. 4. The body is then integrally joined, preferably by spot-welding, to the flanges 7 of the body members 1, and when thus assembled the body and frame are a single integral structure. The front 8 of the body, which may be formed with corrugations to represent the radiator of an automobile, is also integrally joined to the front section 4 of the body in the same manner as the other sections are joined together.

The middle section 5 of the body, as may be termed the section that carries the dash or curved "cowl" portion 9 is strengthened and braced by means of a metal strap 10, which is disposed on the inside of the body. This strap is integrally welded to the section 5 and serves to stiffen the curved cowl portion of the body and keep it in the form desired.

In the rear portion of the body there is mounted a seat 11, which is supported on straps or braces 12 and 13, of which there are two braces 13, one mounted at either side of the body and integrally joined thereto, while the brace 12 is mounted at the rear center of the body, thus providing three braced points of support for the seat 11. At the upper ends the braces 12 and 13 have inwardly extending flanges, upon which the seat rests, and to which the side is integrally connected by being welded thereto, so that the seat also becomes an integral part of the body and frame.

Extending downwardly from the rear portion of the body are metal straps 15 of the form shown in Figs. 1 and 2, on which, at their lowest portions, is pivotally mounted the driving axle 16, which is provided with the usual eccentric portions 17 for receiving the connecting rods 18, which extend forwardly and carry the pedals 19. These connecting rods are attached at the pedals to a crank 20, which is mounted in bent-over lugs 21 which are formed as a part of the transverse frame member 3.

The front axle 24 of the vehicle is mounted in metal straps 25, which are similar to the straps 15 and are attached in the same manner to the lower sides of the frame members 1. This axle 24 extends but a slight distance beyond the frame members 1, where it is flattened to carry vertically extending pins or rivets 26 to serve as axes for wheel spindles 27. The wheel spindles are round bars which are bent and crimped about the pins 26 in such a way as to prevent any disengagement, as shown in Fig. 6, and then extend rearwardly in parallelism, and at their ends are connected to a transversely extending member 28 for operating the spindles in unison. The other ends of the spindles 27 extend outwardly in line with the axle 24 and receive the hubs 29 of the forward wheels 30 of the vehicle. The extreme outer ends of the spindles are flattened and apertured to receive cotter pins 31 for holding the wheels on the spindles, while the cotter pins and the end of the spindles are then covered by metal caps 32, which are provided with flexible ears 52 which may be bent inwardly around the hub of the wheel and between the spokes, as indicated in Fig. 2. This steering mechanism is extremely simple in its construction and in the parts, while the wheels are securely fastened to the ends of the spindles by means of the cotter pins, and there are no nuts to work loose and fall off. Plates 35 are riveted to the flattened ends of the axle to cover and assist in inclosing the crimped portions of the spindles, while the pins 26 may desirably consist of rivets which pass through plates 35 and the flattened portion of the axle, (see Fig. 7).

Mounted in a short plate 42 extending rearwardly from the center or top portion of the brace 10 is a steering column 37 carrying a steering wheel 38, this steering column at its lower end passing through an aperture in the center of a transversely extending brace 39, which is fastened at either end to the straps 25. At a point immediately beyond the brace 39 the steering column extends downwardly, and this downwardly extending portion 40 is connected by means of a short rod 41 to the transverse rod 28 which connects the rear ends of the spindles 27. Rotation of the steering column moves the rod 28 transversely of the frame and thus steers the front wheels of the vehicle in parallelism in exactly the same way as in ordinary automobile steering mechanism.

I have found that a vehicle so constructed is not liable to come apart, is very inexpensive to manufacture, and is sufficiently rigid throughout its frame and body to resist for a long period the very hard usage and abuse to which such children's vehicles are subjected.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle of the class described, the combination of an axle having vertical pins mounted adjacent either end thereof, wheel spindles bent and crimped around said pins to swing horizontally about the same, said spindles extending outwardly in line with said axle from said pins, and also rearwardly therefrom in parallel relation, and wheels mounted on the outwardly extending portion of said spindles.

2. In a vehicle of the class described, the combination of an axle having vertical pins mounted adjacent either end thereof, wheel spindles bent and crimped around said pins to swing horizontally about the same, said spindles extending rearwardly in parallelism from said pins and extending outwardly in line with said axle, the outer ends of said spindles being flattened and apertured to receive fastening means, wheels mounted and fastened on such outwardly extending ends of said spindles, and an operating member connecting the rearwardly extending ends of said spindles.

Signed by me this 14th day of February, 1919.

WILLIAM J. SLEFFEL.